Feb. 23, 1926. 1,574,649
F. P. HIBLER
COMPASS AND MOUNTING
Filed July 27, 1925

Frank P. Hibler
INVENTOR
BY Victor J. Evans
ATTORNEY

WITNESS:

Patented Feb. 23, 1926.

1,574,649

UNITED STATES PATENT OFFICE.

FRANK P. HIBLER, OF HUBBARD, OHIO.

COMPASS AND MOUNTING.

Application filed July 27, 1925. Serial No. 46,424.

*To all whom it may concern:*

Be it known that I, FRANK P. HIBLER, a citizen of the United States, residing at Hubbard, in the county of Trumbull and State of Ohio, have invented new and useful improvements in Compasses and Mountings, of which the following is a specification.

This invention relates to attachments to or accessories for use in connection with automobiles and the like and has for its object the provision of a compass and mounting therefor adapted to be located on the instrument board and capable of being moved selectively into operative or inoperative position, the advantage of the device being that when touring the user will be capable of ascertaining the points of the compass, it being well known that it is frequently a difficult matter to determine directions especially in cloudy weather or at night.

An important object of the invention is to provide a device constructed as a unit capable of being manufactured and sold as a complete and separate entity adapted to be mounted on the instrument board at a desired location thereon.

Another object is the provision of a device of this character provided with an adjustment whereby the compass itself may be positioned in a horizontal plane regardless of the tilt or inclination of the instrument board upon which the device is mounted.

An additional object is to provide a compass structure and bracket therefor which will be simple and inexpensive in manufacture, easy to install, efficient and durable in service, and a general improvement in the art.

Figure 1:
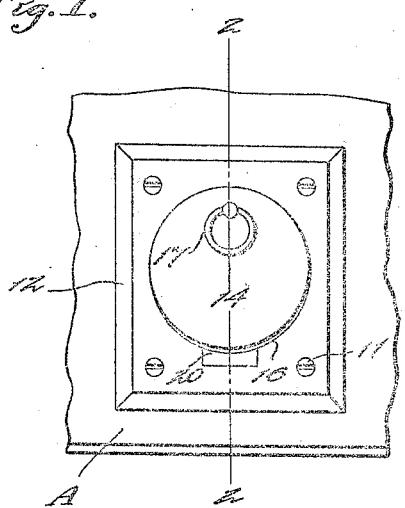
Figure 2:
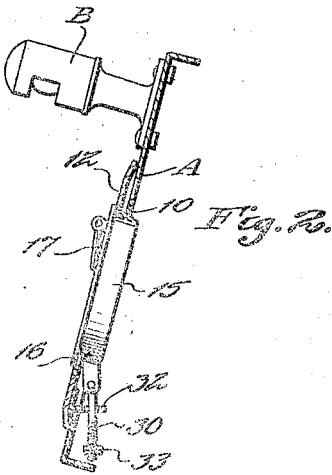
Figure 3:
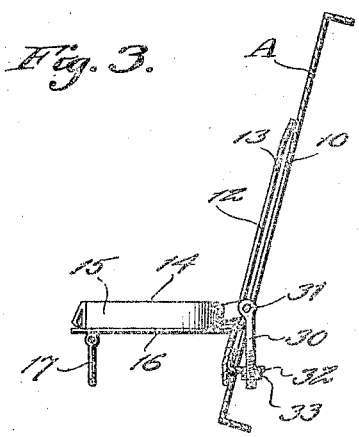
Figure 4:
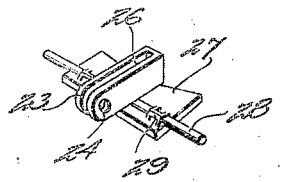
Figure 5:
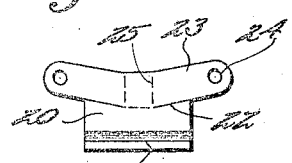
Figure 6:
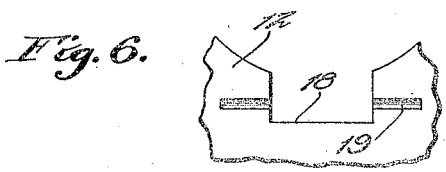

With the above and other objects and advantages in view the invention consists in the details of construction and arrangement of parts to be hereinafter more fully described and claimed, and illustrated in the accompanying drawing in which:

Figure 1 is an elevation of the device applied to an instrument board and in inoperative position, Figure 2 is a vertical section therethrough taken on the line 2—2 of Figure 1, Figure 3 is a view similar to Figure 2 but showing the compass swung out into operative position, Figure 4 is a detail perspective view of a portion of the mounting, Figure 5 is a view of the blank on which the device shown in Figure 4 is constructed, Figure 6 is a fragmentary detail view looking at the rear side of the escutcheon plate.

Referring more particularly to the drawings the letter A designates a portion of the instrument board of a motor vehicle, and B indicates a conventional dash lamp mounted thereon. This lamp may be the one ordinarily present or may be an addition provided for the purpose of illuminating the compass to be described.

In carrying out the present invention the instrument board A is provided with an opening 10 of suitable size in front of which is secured, by screws 11 or the like, an escutcheon plate 12 formed with a preferably circular opening 13. The size, shape, material and finish are immaterial details which may be varied to suit the taste of the manufacturer.

The numeral 14 designates a compass of any ordinary or preferred type and details thereof are not illustrated. This compass is, however, shown as including a cylindrical casing 15 of substantially the same size as the opening 13 so as to fit neatly therein, the bottom of the casing having an outstanding flange 16 seating against the outside of the plate 12 and provided with a ring or other similar element 17 providing a finger grip.

At the lower part of the opening 13 is a recess 18 and at opposite sides thereof the rear of the plate 12 is pressed or otherwise formed to define depressions or concavities 19 arranged in alinement.

Suitably secured to the casing 15 of the compass is a bracket structure designated generally by the numeral 20, which bracket structure may conveniently be formed from a single blank such as that illustrated in Figure 5. This blank includes a plate portion grooved or pressed to provide a channel 21 and partially slit along the lines 22 and otherwise shaped to define ears 23 perforated at 24. In constructing the bracket 20 from the blank, the ears 23 are bent along the lines 25 into spaced parallel relation to define a U-shaped member 26 and attaching portions 27. A pintle pin 28, is located within the channel or groove 21 and is held therein by striking up the metal of the attaching portions 27, as shown at 29. The pintle pin 28 is also engaged within the grooves or channels 19 in the back of the escutcheon plate. By this means it is evident that the compass structure is pivoted with respect to the escutcheon plate and instrument board so as to be capable of swinging from the inoperative position, shown in Figure 2, to an operative position as shown in Figure 3.

As instrument boards are usually tilted or inclined differently on different cars, it becomes necessary to provide means for effecting adjustment of the compass so that it will be disposed in a truly horizontal position when in use. To carry out this feature I provide an eye bolt pivoted between the ears 23 by a rivet or the like 31 passing through the holes 24. This eye bolt also passes through a suitable hole in an angular bracket 32 secured on the rear of the escutcheon plate and carries an adjusting nut 33.

When the compass is in extended position it is obvious that by adjusting the nut 33 it may be brought into the horizontal position necessary to insure proper action.

When the device is not in use the compass is simply swung upwardly so as to be disposed within the opening 10 on the instrument board and when its use is desired the operator simply grasps the finger hold 17 and swings the compass outwardly and downwardly into horizontal position where it will remain fully exposed to view and where it may be easily illuminated by the lamp B.

From the foregoing description and a study of the drawings it will be apparent that I have thus provided a neat, attractive and highly useful device for the purpose specified. It is believed that the construction, operation and advantages will be readily apparent to one skilled in the art without further explanation.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:

1. In an apparatus of the character described, a support having an opening therein, a plate secured upon the support and having an opening adjacent the first-named opening, a compass unit adapted to fit within said openings, a pivotal mounting for the compass unit permitting it to swing from inoperative position in a vertical plane into operative position in a horizontal plane, and means for limiting the outward swinging movement.

2. In an apparatus of the character described, a support having an opening therein, a plate secured upon the support and having an opening adjacent the first-named opening, a compass unit adapted to fit within said openings, a pivotal mounting for the compass unit permitting it to swing in a vertical plane from vertical inoperative position to horizontal operative position, means for limiting the outward swinging movement comprising a bracket carried by the unit, a guide carried by the plate, and an element carried by the bracket and cooperating with the guide.

3. In an apparatus of the character described, a support having an opening therein, a plate secured upon the support and having an opening adjacent the first-named opening, a compass unit adapted to fit within said openings, a pivotal mounting for the compass unit permitting it to swing in a vertical plane from vertical inoperative position to horizontal operative position, means for limiting the outward swinging movement comprising a bracket carried by the unit, a guide carried by the plate, and an element carried by the bracket and cooperating with the guide formed as a screw carrying a nut.

4. In an apparatus of the character described, a support having an opening therein, a plate secured upon the support and having an opening adjacent the first-named opening, a compass unit adapted to fit within said openings, a pivotal mounting for the compass unit permitting it to swing in a vertical plane, means for limiting the outward swinging movement comprising a bracket secured to the unit, an apertured guide carried by the plate, an element pivotally connected with the bracket and slidable through the guide, and a stop adjustably mounted on said element and engageable with the guide.

5. In an apparatus of the character described, a support having an opening therein, a plate secured upon the support and having an opening adjacent the first-named opening, a compass unit adapted to fit within said openings, a pivotal mounting for the compass unit permitting it to swing in a vertical plane, means for limiting the outward swinging movement, comprising a bracket carried by the unit, a guide carried by the plate, an element carried by the bracket and cooperating with the guide, the bracket being formed to define attaching plate portions and a U-shaped portion upon and at right angles thereto, the attaching portion constituting supporting means for the pivot mounting of the unit.

In testimony whereof I affix my signature.

FRANK P. HIBLER.